UNITED STATES PATENT OFFICE.

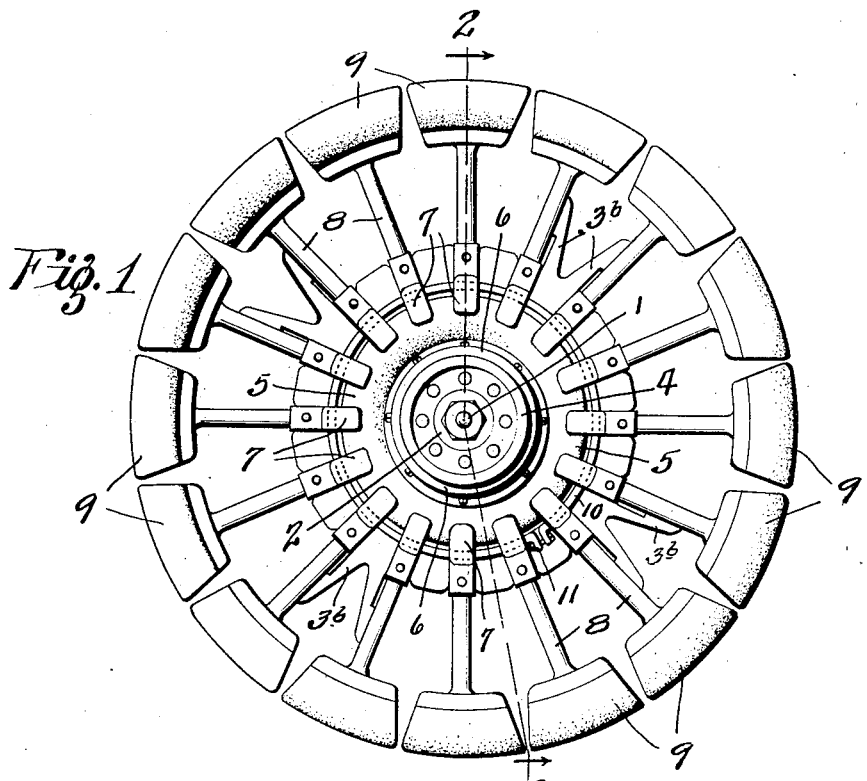
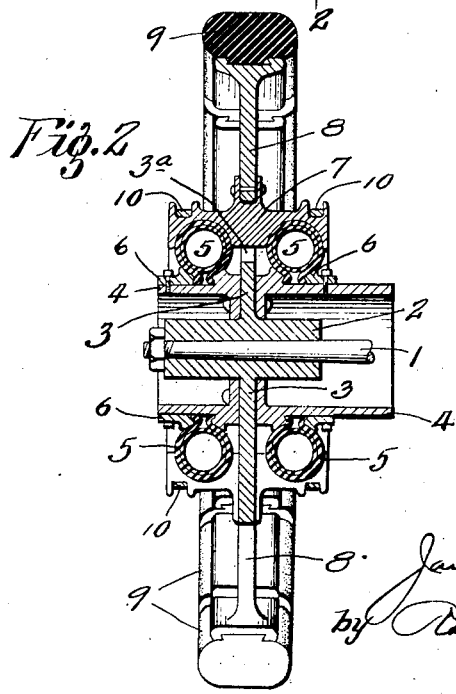

JAMES A. CARTER, OF ST. LOUIS, MISSOURI.

WHEEL.

1,376,603.　　　　Specification of Letters Patent.　　Patented May 3, 1921.

Application filed November 15, 1919. Serial No. 338,174.

*To all whom it may concern:*

Be it known that I, JAMES A. CARTER, a citizen of the United States, residing at the city of St. Louis, State of Missouri, have invented a certain new and useful Improvement in Wheels, of which the following is a specification, reference being had to the accompanying drawing, forming a part thereof.

This invention relates generally to vehicle wheels and, more particularly, to a certain new and useful improvement in the type commonly known as pneumatic wheels, the principal object of my present invention being to provide a wheel of the kind stated wherein there are a plurality of treads or shoes designed to contact with and engage the ground, the treads or shoes being individually supported by spokes carried upon saddles, which latter are, in turn, supported by pneumatic tubes or tires, the tubes or tires being located within the wheel and out of exposed position relatively to the ground, whereby wear of the tubes or tires is reduced and punctures thereof largely, if not entirely, obviated, and the several saddles and their carried spokes and shoes being movable independently of one another relatively to the tubes or tires.

With the above and other objects in view, my present invention resides in the novel features of form, construction, arrangement, and combination of parts hereinafter described and afterward pointed out in the claims.

In the accompanying drawing, I have illustrated the preferred form of my invention, in which, Figure 1 is a side elevational view of the wheel; and Fig. 2 is a vertical sectional view therethrough taken approximately on the line 2—2, Fig. 1.

Referring now more in detail to the said drawing, 1 indicates the axle or skein, on which is mounted the hub proper 2, said hub having a web or flange 3, preferably centrally located, to which is suitably fixed the barrel-portions 4 of the hub, one of which, usually the inwardly extending one, may provide means for the employment of a band-brake. These barrel-portions 4 also provide mounts for pneumatic tubes 5, there being one of these tubes, which are in practice substantially the same as inflatable or pneumatic tubes or tires, arranged on each side of the web-portion 3, as seen especially in Fig. 2.

These pneumatic hub members or tires 5 may be of any desired form, but I have shown them as clencher tires, each of which is demountable by virtue of the rim-portions 6 removably secured or fastened, as shown to the barrel-portions 4.

7 indicates a saddle-member, to which is attached a spoke-member 8 carrying a preferably cushion tread or shoe-portion 9 at its outer end. There are a series of these parts, *i. e.*, saddle-members, spokes, and shoe-members, arranged around the wheel, the saddle-members, carrying their respective spokes and shoe-members, being independently one from another movable radially of the wheel in suitable spaced slots or grooves indicated at $3^a$, Fig. 2, in the web-portion 3. At intervals, the web-portion 3 is preferably extended outwardly, as at $3^b$, to increase its driving connection with the spokes at points preferably arranged equidistantly around the wheel.

The manner of attachment of the shoes 9 to the outer ends of the spokes 8 may be left to the constructor, as this forms no part of my present invention; nor is the manner of connecting or fastening the spokes to the saddles important, as the spokes may be integral with the saddles or rigidly connected or fastened to the saddles in any suitable or well known manner.

Each saddle 7 is provided with a seat or groove at each side in which there are mounted bands 10 encircling all of the saddles and holding the saddles against radial and lateral displacement. These bands 10 have their ends bent at angles and are preferably more or less adjustably connected together by bolts 11, whereby the bands may be conveniently removed and the saddles and their connected parts replaced or renewed as or when required.

In operation, the parts being assembled as shown, the weight of the vehicle and load, being transmitted through the skein 1, will be carried resiliently by the tread-portions 9 as they successively come in contact with or engage the ground, and the tread portions 9 will, through their spoke and saddle members, support the weight at two points through the medium of the hub-tubes 5, which, being located equidistantly on each side of the weight, will resiliently afford ample lateral, as well as vertical, movement to the tread portions in contact with the ground. As there are but few occasions when there are more than two treads 9 in contact with the ground at the same moment, it is evident that the weight of the car or truck transmitted through the skein 1 will be substantially in a vertical direction, and the radial grooves or slots 3ª in the webs 3 will take care of this vertical movement, the bands 10 permitting the saddles to compress the hub-tires 5, and when the saddles are relieved from their weight-carrying load, they will again move outwardly until restrained by the bands 10, they at all times being in driving relation to the web 3 of the hub.

I am aware that changes in the form, construction, arrangement and combination of the several parts of the wheel may be made and substituted for those herein shown and described without departing from the nature and principle of my invention.

Having thus described my invention, what I claim and desire to secure by Letters Patent is:

1. A wheel comprising a hub, an annular web upon the hub, a pneumatic hub element carried by the hub on each side of the web, and an annular series of tread members carried for resilient movement by the pneumatic hub elements, the web having a sliding driving connection with the tread members.

2. A wheel comprising a hub, an annular web upon the hub, a pneumatic hub element carried by the hub on each side of the web, saddles seated upon the hub elements for radial and rocking movement relatively thereto, and an annular series of tread members supported by the saddles, the web having a sliding driving connection with the saddles.

3. A wheel comprising a hub, an annular web upon the hub, a pneumatic hub element carried by the hub on each side of the web, saddles seated upon the hub elements for radial and rocking movement relatively thereto, an annular series of tread members supported by the saddles, and means for restraining the outward radial movement of the saddles and their supported tread members, the web having a sliding driving connection with the saddles.

4. A wheel comprising a hub, an annular web upon the hub, a pneumatic hub element carried by the hub on each side of the web, saddles seated upon the hub elements for radial and rocking movement relatively thereto, an annular series of tread members supported by the saddles, and bands encircling all the saddles for restraining the outward radial movement of the saddles and their supported tread members, the web having a sliding driving connection with the saddles.

5. A wheel comprising a hub, an annular web upon the hub, a pneumatic hub element carried by the hub on each side of the web, saddles seated upon the hub elements for yielding movement relatively to the web and hub, tread-supporting spokes carried by the saddles, and bands embracing all the saddles for preventing displacement thereof relatively to the hub-elements, the web having a sliding driving connection with all the saddles.

6. A wheel comprising a hub, a radially grooved annular web upon the hub, a pneumatic hub element carried by the hub on each side of the web, saddles seated upon the hub elements for yielding movement relatively to the web and hub and disposed in the grooves of the web, tread-supporting spokes carried by the saddles, and bands embracing all the saddles for preventing displacement thereof relatively to the hub-elements.

In testimony whereof, I have signed by name to this specification.

JAMES A. CARTER.